United States Patent
Wada et al.

(10) Patent No.: US 8,633,925 B2
(45) Date of Patent: Jan. 21, 2014

(54) IMAGE PROCESSOR, IMAGE PROCESSING METHOD, COMPUTER PROGRAM, RECORDING MEDIUM, AND SEMICONDUCTOR DEVICE

(75) Inventors: Shinya Wada, Kanagawa (JP); Masaaki Oka, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 420 days.

(21) Appl. No.: 13/116,217

(22) Filed: May 26, 2011

(65) Prior Publication Data
US 2011/0304621 A1     Dec. 15, 2011

(30) Foreign Application Priority Data
Jun. 11, 2010 (JP) .................................. 2010-133997

(51) Int. Cl.
*G06T 17/00* (2006.01)
*G06T 13/00* (2011.01)
*G06G 5/00* (2006.01)

(52) U.S. Cl.
USPC ............ 345/420; 345/473; 345/474; 345/619

(58) Field of Classification Search
None
See application file for complete search history.

(56) References Cited

U.S. PATENT DOCUMENTS

| | | | |
|---|---|---|---|
| 5,990,896 A * | 11/1999 | Barrus | 345/420 |
| 7,088,358 B2 * | 8/2006 | Aharon et al. | 345/419 |
| 7,088,366 B2 * | 8/2006 | Okubo | 345/473 |
| 7,864,173 B2 * | 1/2011 | Handley et al. | 345/420 |
| 8,130,220 B2 * | 3/2012 | Ahn et al. | 345/420 |
| 2003/0022715 A1 | 1/2003 | Okubo | |
| 2008/0275831 A1 * | 11/2008 | Reil | 706/23 |
| 2010/0277483 A1 * | 11/2010 | Lee et al. | 345/474 |

FOREIGN PATENT DOCUMENTS

| | | |
|---|---|---|
| JP | 6-277362 | 10/1994 |
| JP | 2003-44878 | 2/2003 |
| JP | 2006-212080 | 8/2006 |

OTHER PUBLICATIONS

Wernert, Eric A., and Andrew J. Hanson. "A framework for assisted exploration with collaboration." Visualization'99. Proceedings. IEEE, 1999.*

(Continued)

*Primary Examiner* — Kee M Tung
*Assistant Examiner* — Zhengxi Liu
(74) *Attorney, Agent, or Firm* — Katten Muchin Rosenman LLP

(57) ABSTRACT

To provide an image processor that is capable of presenting images in which a character object is moved smoothly and naturally as a user intends it to be, regardless of the change in shape of an object.
An image processor 1 according to the present invention includes an object behavior control section 31 for controlling an object and movement of a character object in a virtual 3D space, the character object being capable of being moved in the virtual 3D space according to an operation by a user, the object being made up of one or more polygons in the virtual 3D space; a character location determination section 34 for identifying the shape of such a part of the object that is close to the character object, according to the shape of the object and the location of the character object obtained as a result of movement control; and a character location/orientation correction section 35 for correcting the location and orientation of the character object relative to the object, according to the result of identification by the character location determination section 34.

12 Claims, 20 Drawing Sheets

(56) References Cited

OTHER PUBLICATIONS

Kamat, V.R.; Martinez, J.C., "Variable-speed resource motion in animations of discrete-event process models," Simulation Conference, 2003. Proceedings of the 2003 Winter , vol. 2, No., pp. 1518,1526 vol. 2, Dec. 7-10, 2003.*

Autodesk, "Using Autodesk HumanIK middleware to Enhance Character Animation for Game" 2010.*

"Interactive Avatar Control" http://graphics.cs.cmu.edu/projects/Avatar/. Archived on Jun. 20, 2006. Retrieved on Sep. 13, 2013 from <http://web.archive.org/web/20060620035400/http://graphics.cs.cmu.edu/projects/Avatar/>).*

Notification of Reason(s) for Refusal dated Apr. 17, 2012, from corresponding Japanese Application No. 2010-133997.

* cited by examiner

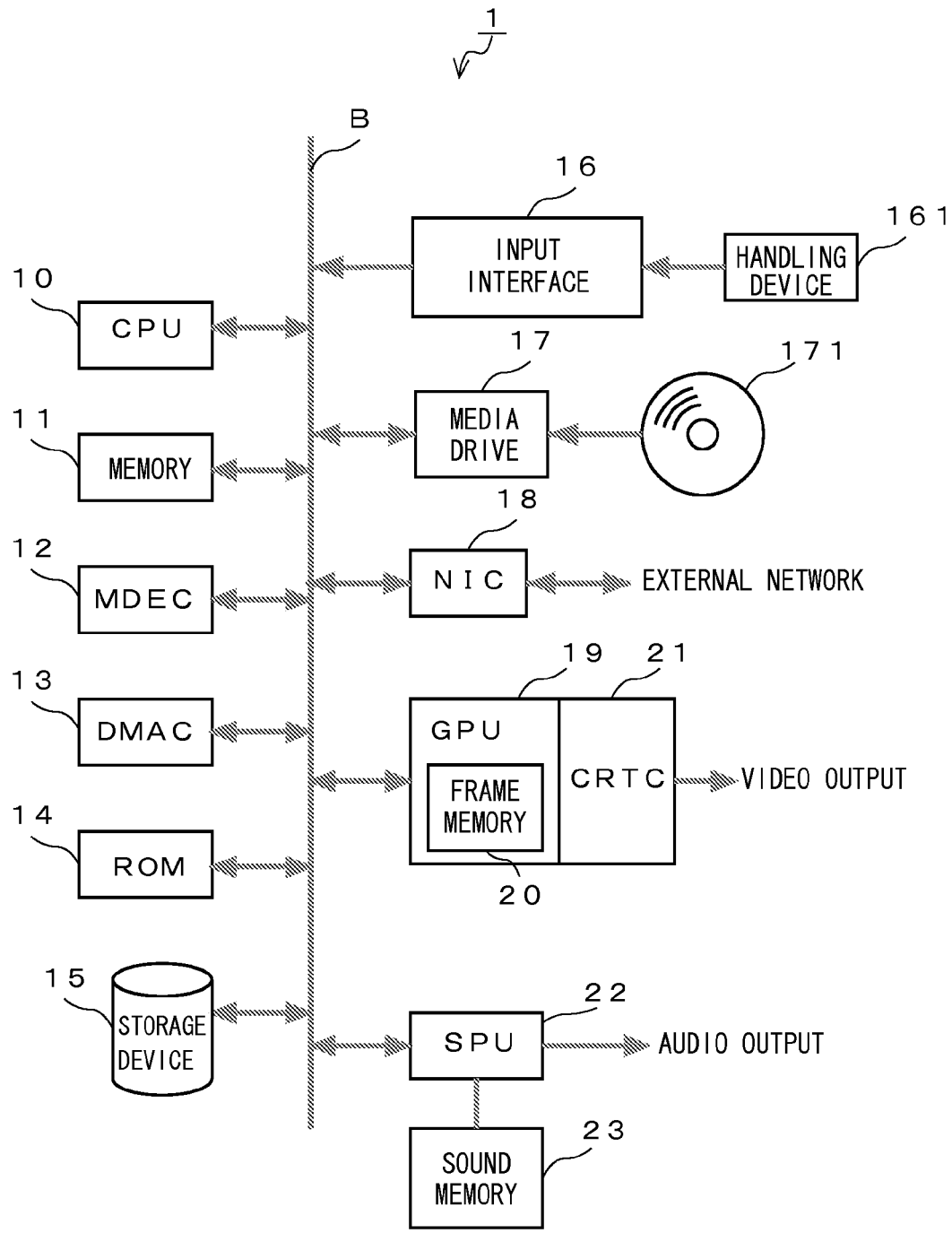
F I G. 1

| POLYGON 1 | COORDINATE OF VERTICES | COLOR(S) | NORMAL VECTORS | ... |
| POLYGON 2 | COORDINATE OF VERTICES | COLOR(S) | NORMAL VECTORS | ... |
| POLYGON 3 | COORDINATE OF VERTICES | COLOR(S) | NORMAL VECTORS | ... |

F I G. 3

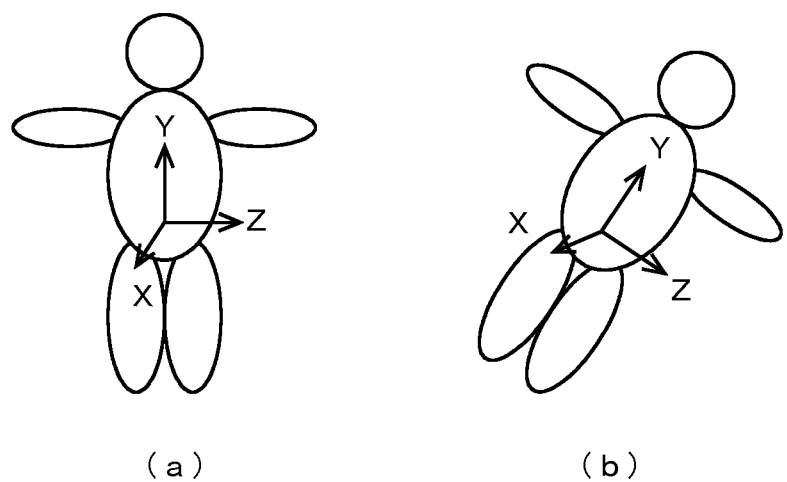
F I G. 4

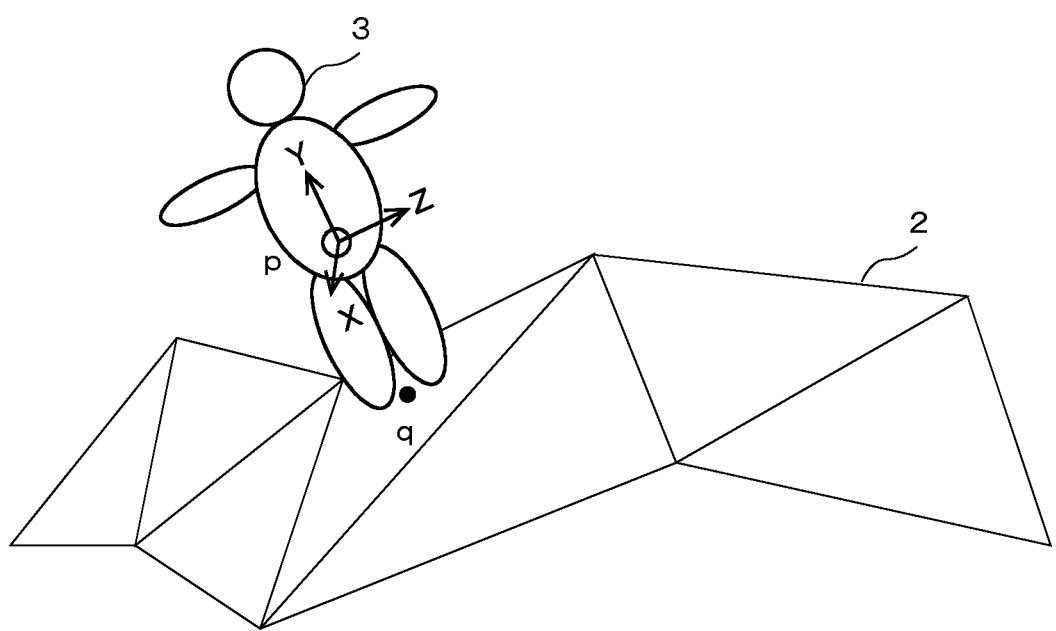
F I G. 5

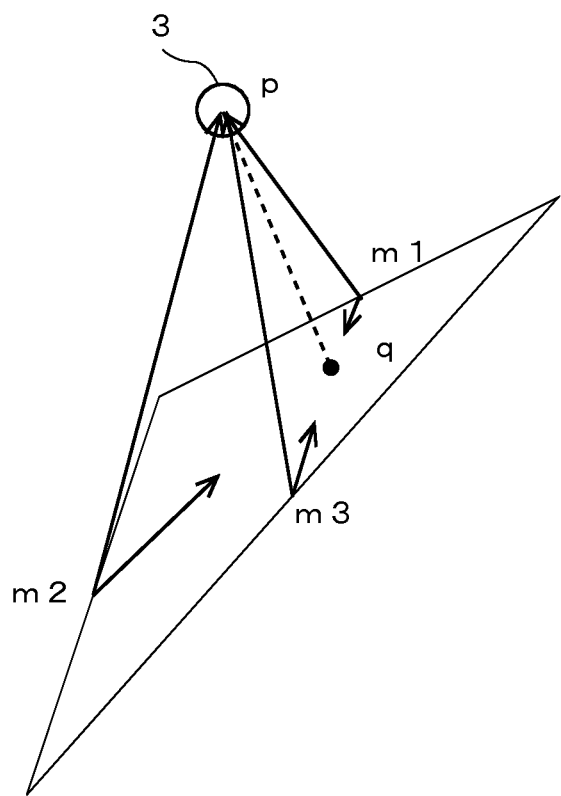
F I G. 6

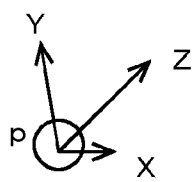
(a)
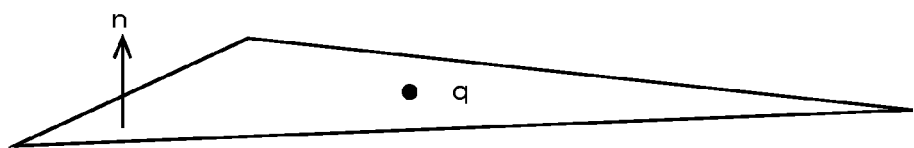
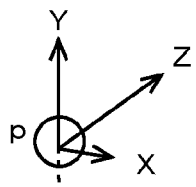
(b)
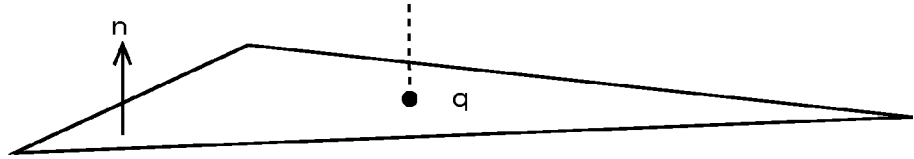
(c)
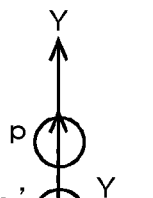
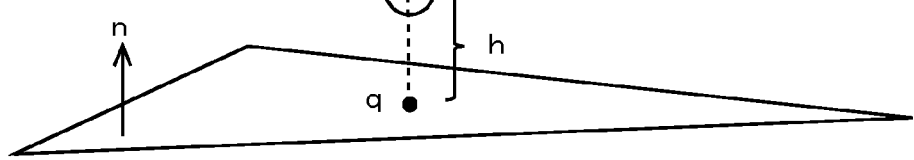
FIG. 10

(a) 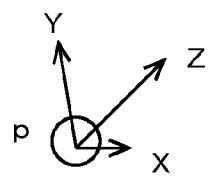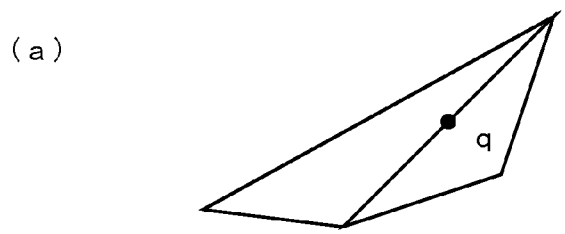
(b) 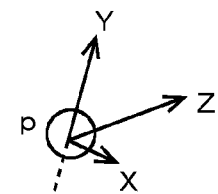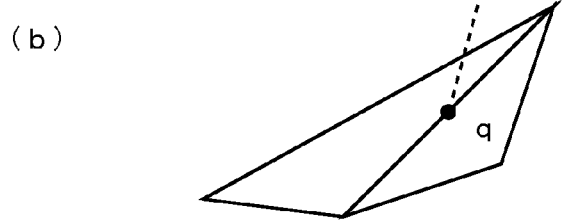
(c) 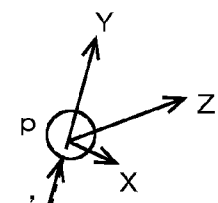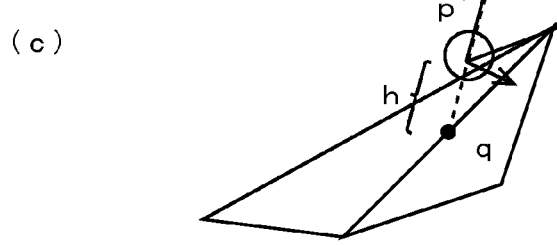
F I G. 1 1

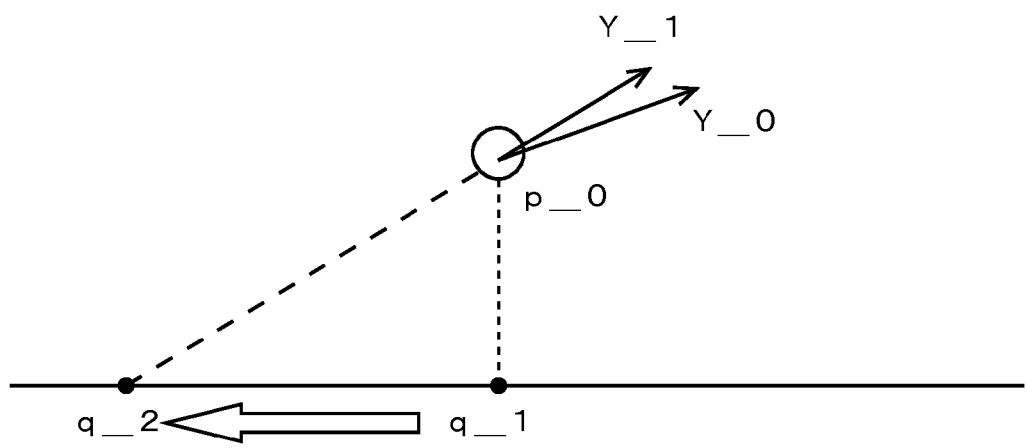
F I G. 1 3

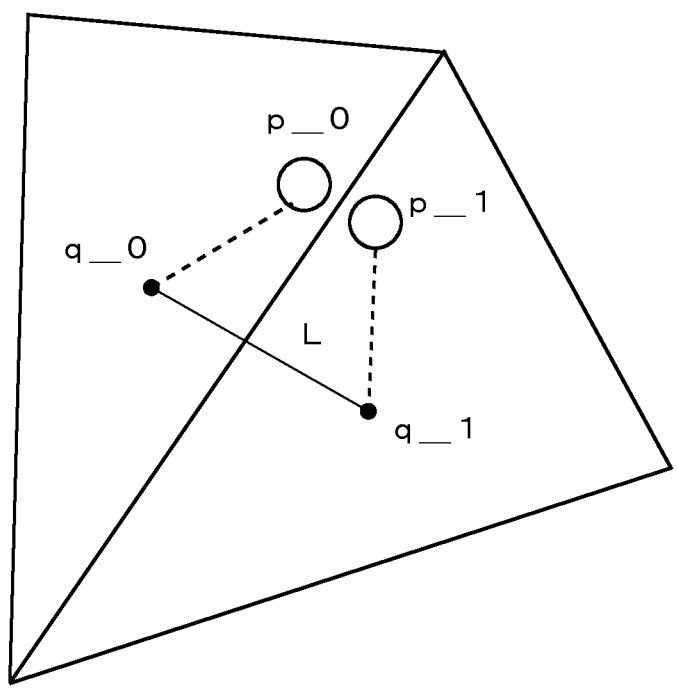
F I G. 1 5

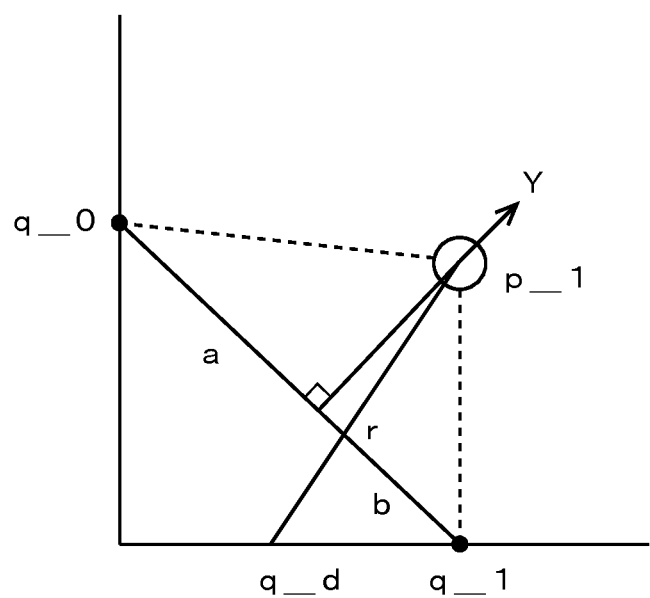
F I G. 1 6

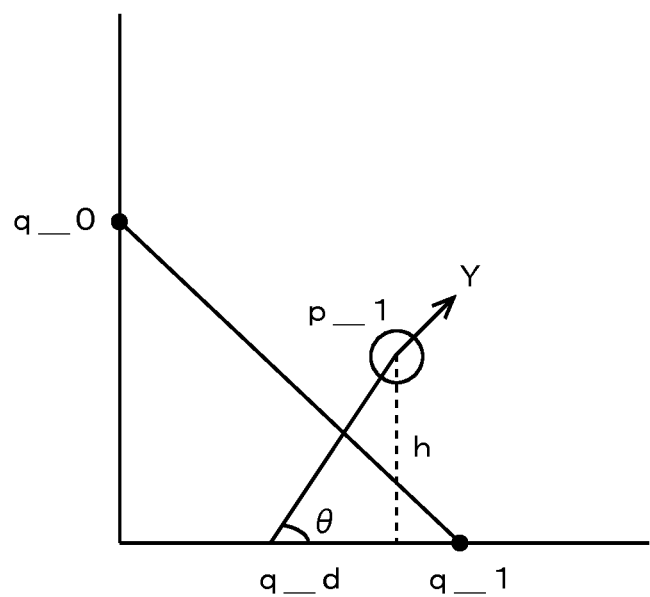
F I G. 1 7

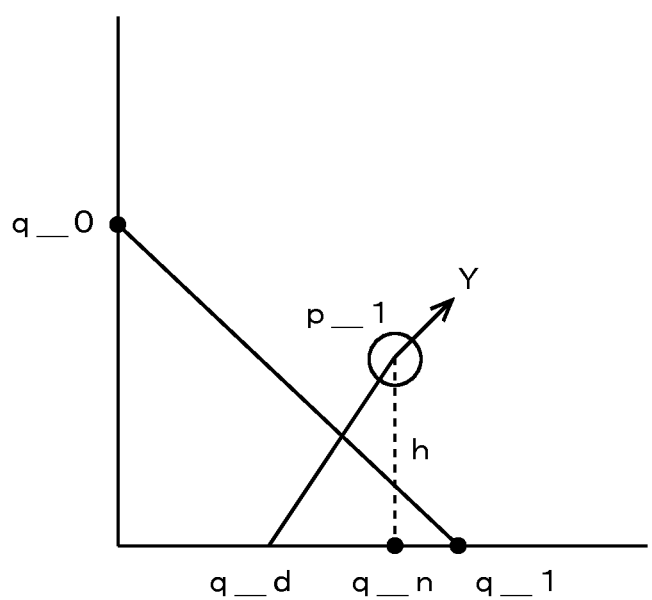
F I G. 1 8

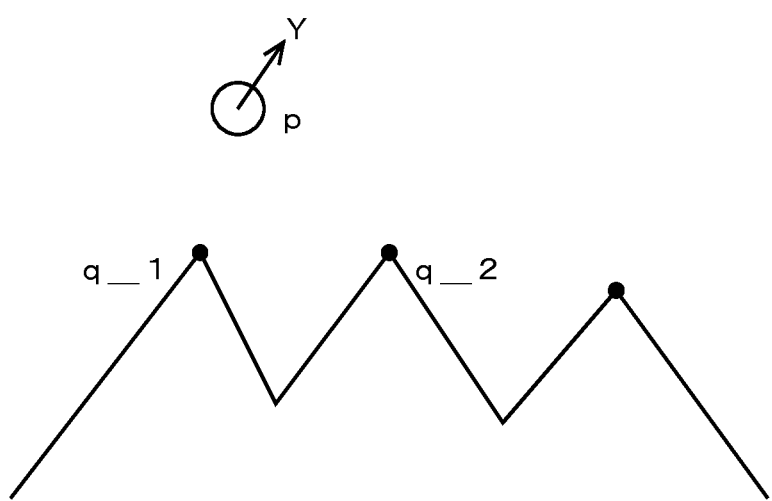
F I G. 1 9

IMAGE PROCESSOR, IMAGE PROCESSING METHOD, COMPUTER PROGRAM, RECORDING MEDIUM, AND SEMICONDUCTOR DEVICE

BACKGROUND OF THE INVENTION

1. Field of the Invention

The present invention relates to an image processing technique for use in realizing natural representation of images in computer graphics with less processing load, in which the images may be a person, an animal, a vehicle such as an automotive or an airplane, or an object that moves on a complex ground or a huge object whose shape is changing, in a virtual 3D space.

2. Description of the Related Art

A recent advancement in computer graphics technique allows more natural representation of 3D images than before. Computer graphics are used in various fields. Computer games are one of typical examples where the computer graphics are used.

Some computer games, such as so-called action adventure games, are designed in a virtual 3D space in which a character object or objects can be moved by a user. In such computer games, a real-time response to the user's input is preferred to provide a character object that behaves or moves in a natural manner. The character object is an image of, for example, a person, an animal, a vehicle such as an automotive or an airplane, or a predetermined object.

In such computer games, the character object comes into contact with various objects that are provided in the virtual 3D space. The object with which the character object contacts has a fixed shape or a changing shape. The former may be, for example, a ground or a cliff while the latter may be a huge creature such as a monster.

When the character object moves on the ground, the location and orientation of the character object are changed according to the shape (surface texture) of the ground. Japanese Patent Laid-Open Nos. 6-277362 and 2003-44878 disclose inventions relating to an image processing when the character object moves along the ground surface.

In Japanese Patent Laid-Open No. 6-277362, there is disclosed a 3D gaming device with which the topographic shape of the ground in the virtual 3D space is considered and reflected to the location and orientation of the character object. In this 3D gaming device, topographic information of a game field is stored and this topographic information is used to change object information of a moving object (character object). By using the object information that has been changed, the image of the character object is created with the topographic information taken into account. In Japanese Patent Laid-Open No. 2003-44878, there is disclosed an image generation system which provides natural behaviors of a model object (character object) with less processing load. The shape of the model object is changed depending on the topographic shape of the ground in order to prevent a part object (such as limbs of a model object) from being hidden by the ground surface.

On the other hand, when the character object moves on an object whose shape is changing, the location and orientation of the character object should be changed immediately according to the change in shape of the object. However, such image processing requires high processing load. There is a limit to provide a real-time result. Accordingly, conventional techniques rely on reproduction of video images that have been previously generated to move the character object on a changing object.

In Japanese Patent Laid-Open Nos. 6-277362 and 2003-44878, only the character objects that are moved on an object whose shape is fixed is taken into account. However, depending on the scenario of a game, the character object may be moved on a moving object such as a huge creature. The techniques disclosed in Japanese Patent Laid-Open Nos. 6-277362 and 2003-44878, however, do not consider movement on a moving object as described above. In addition, when video images are reproduced to provide an object whose shape is changed, the character object is limited in movement, so that the user's input cannot be reflected perfectly.

A major purpose of the present invention is to provide an image processor with which images can be obtained wherein a character object is moved in a natural manner according to the user's intent, regardless of any change in shape of an object, while taken the above into consideration.

SUMMARY OF THE INVENTION

An image processor according to the present invention that solves the aforementioned problems comprises object movement control means for controlling an object and movement of a character object in a virtual 3D space, the character object being capable of being moved in the virtual 3D space according to an operation by a user, the object being made up of one or more polygons in the virtual 3D space; character location determination means for identifying the shape of such a part of said object that is close to said character object, according to the shape of said object and the location of said character object obtained as a result of movement control; and character location/orientation correction means for correcting the location and orientation of said character object relative to said object, according to the result of identification by said character location determination means.

The image processor according to the present invention corrects the location and orientation of the character object depending on the shape of the object. The shape of the object may be changed through the control of the movement. The location and orientation of the character object may be corrected according to this change. Thus, there is provided an image in which the character object is moved in a natural manner regardless of the change in shape of the object.

Said object has a surface made up of, for example, said polygon(s) having either one of flat, convex, concave, and convex-concave shapes. In the image processor according to the present invention, said character location determination means is adapted to determine to which one of the flat, convex, concave, and convex-concave shapes of said object said character object is closest, and said character location/orientation correction means is adapted to correct the location and orientation of said character object according to the shape of such a part of said object that is located closet to said character object.

In the image processor according to the present invention, for example, the location and orientation of said character object is defined in a local coordinate system of said character object to represent the movement of said character object. In this case, for example, said character location determination means is adapted to identify the shape of such a part of said object that is close to said character object, according to the positional relationship between the point of origin of said local coordinate system and the polygon that is closest to that point of origin.

Further, said character location determination means may identify the shape of such a part of said object that is close to said character object by using a contact point between one or more polygons that constitute said object and a virtual sphere having a size corresponding to said character object in said virtual 3D space. In this case, a so-called ray casting technique can be used.

Said character location/orientation correction means is adapted to correct the orientation of said character object by means of, for example, rotating said local coordinate system, and correct the location of said character object by means of shifting the point of origin of said local coordinate system.

In this case, said character location/orientation correction means may have a limitation in angle which rotates said local coordinate system. This limitation serves to prevent the orientation of the character object from being corrected unnaturally. In addition, said character location/orientation correction means may correct the location of said character object by means of shifting, for example, said point of origin in the direction of the Y-axis after correction of said local coordinate system.

Said character location/orientation correction means is adapted to correct the location of said character object by means of shifting said character object in either one of two procedures when such a part of said character object that is closest to said object is shifted as a result of the movement of said character object, the two procedures being (1) to move said character object by an amount identical to the amount of movement of the point that is closest to said character object before being shifted, and (2) to move the point that is closest to said character object after being shifted back to the location where it was before being shifted. This makes it possible to prevent the character object from being moved without any input to control the movement.

In a method of processing images according to the present invention that is carried out by an image processor comprising object movement control means for controlling an object and movement of a character object in a virtual 3D space, the character object being capable of being moved in the virtual 3D space according to an operation by a user, the object is made up of one or more polygons in the virtual 3D space. In this image processing method, the shape of such a part of said object that is close to said character object is identified, according to the shape of said object and the location of said character object obtained as a result of movement control; and the location and orientation of said character object relative to said object are corrected, according to the result of identification.

A computer program according to the present invention is a computer program for use in implementing the following features in a computer system comprising object movement control means for controlling an object and movement of a character object in a virtual 3D space, the character object being capable of being moved in the virtual 3D space according to an operation by a user, the object being made up of one or more polygons in the virtual 3D space, the features comprising: identifying the shape of such a part of said object that is close to said character object, according to the shape of said object and the location of said character object obtained as a result of movement control; and correcting the location and orientation of said character object relative to said object, according to the result of identification. The computer program as described above is stored on, for example, a computer readable recording medium.

A semiconductor device according to the present invention is a semiconductor device for use in establishing, in an image processor comprising object movement control means for controlling an object and movement of a character object in a virtual 3D space, the character object being capable of being moved in the virtual 3D space according to an operation by a user, the object being made up of one or more polygons in the virtual 3D space; character location determination means for identifying the shape of such a part of said object that is close to said character object, according to the shape of said object and the location of said character object obtained as a result of movement control; and character location/orientation correction means for correcting the location and orientation of said character object relative to said object, according to the result of identification by said character location determination means.

In the image processor according to the present invention as described above, the location and orientation of the character object are corrected according to the shape of the object, which provides an image in which the character object is moved in a natural manner regardless of the change in shape of the object.

BRIEF DESCRIPTION OF THE DRAWINGS

FIG. 1 is a view showing the entire configuration of an image processor according to this embodiment;

FIG. 3 shows a specific example of what is stored on the object shape memory section;

FIG. 4 is a view exemplifying character objects and local coordinate systems;

FIG. 5 is a view showing the character object located on the object;

FIG. 6 is a view illustrating that the character object is located on the flat portion of the object;

FIGS. 10(a) to 10(c) are views illustrating how to correct the location and orientation of the character object on a flat surface of the object;

FIGS. 11(a) to 11(c) are views illustrating how to correct the location and orientation of the character object on a convex portion of the object;

FIG. 13 is a view illustrating how to prevent the sliding;

FIG. 15 is a view illustrating how to correct the location and orientation of the character object when the character object is located in a concave portion of the object;

FIG. 16 is a view illustrating how to correct the location and orientation of the character object when the character object is located in a concave portion of the object;

FIG. 17 is a view illustrating how to correct the location and orientation of the character object when the character object is located in a concave portion of the object;

FIG. 18 is a view illustrating how to correct the location and orientation of the character object when the character object is located in a concave portion of the object;

FIG. 19 is a view illustrating how to correct the location and orientation of the character object when the character object is located on a convex-concave portion of the object.

DESCRIPTION of THE PREFERRED EMBODIMENTS

Figure 2:
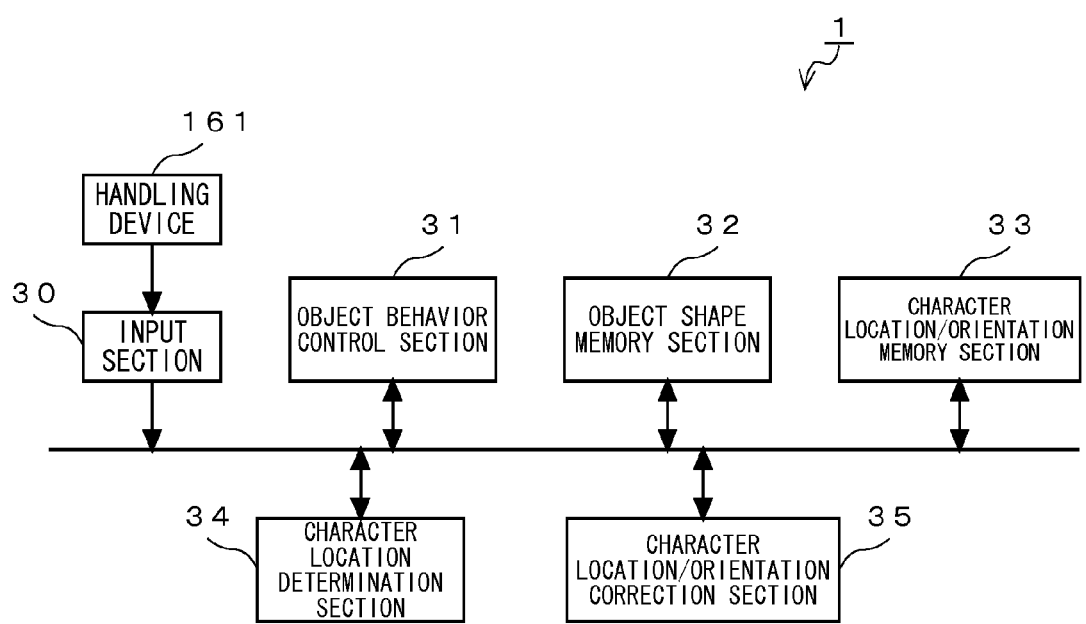
FIG. 2 is a functional block diagram illustrating functions to be implemented in the image processor.

Now, an embodiment of the present invention is described with reference to the drawings.

FIG. 1 is a view showing the entire configuration of an image processor 1 according to this embodiment. The image processor 1 has a function of loading programs and data from a medium 171 such as a CD-ROM or a DVD-ROM, and executing them to display images on a display device (not shown). It also has a function of producing sounds through, for example, a speaker. The image processor 1 may be implemented by, for example, a general-purpose computer, a video gaming device, or an entertainment device, each having image processing functions.

The image processor 1 comprises a CPU (Central Processing Unit) 10, a memory 11 which is a RAM, an MPEG (Moving Picture Experts Group) decoder (MDEC) 12, a DMAC (Direct Memory Access Controller) 13, a ROM 14 on which programs such as BIOS are stored, a storage device 15 such as a hard disk, an input interface 16 for receiving information entered through a handling device 161, a media drive 17 in which a medium 171 is loaded, a NIC (Network Interface Card) 18 for communicating data with other device(s) via an external network or networks, a graphics processing unit (GPU) 19 having a frame memory 20, the frame memory 20 where images are rendered by the GPU 19, a CRTC (CRT Controller) 21 that generates a video output signal, and a sound processing unit (SPU) 22 for reading sound data from a sound memory 23 where it has been stored, to produce it as an audio output signal. They are connected to each other via a bus B.

The video output signals are generated according to the NTSC (National Television Standards Committee) or PAL (Phase Alternation by Line) standard and are transmitted from the CRTC 20 to the display device.

The CPU 10 is a semiconductor device that loads a boot program from the ROM 14 and starts executing the boot program to invoke the operating system during the activation of the image processor 1. Further, the CPU 10 reads an application program from the medium 171 in the media drive 17 or from the storage device 15 and stores it onto the main memory 11. In addition, the CPU 10 has a function of reading, from the medium 171, such data that is required for generating images, such as 3D shape data (coordinates of vertices of each polygon) made up of several basic shape components (polygons) or texture data, and storing it on the storage device 15, when it reads the application program from the medium 171. The 3D shape data represents objects in a virtual 3D space.

The CPU 10 also has a function of performing geometry processing such as coordinate transformation and perspective transformation for the 3D shape data, and producing drawing data containing geometry-processed polygon definition information (e.g., the location, a color, texture coordinates, a fog color of each of the vertices and the center of gravity of the polygon (s) used).

The GPU 19 is a semiconductor device that has a function of performing rendering with the drawing data to draw the polygon (s) in the frame memory 20 as a drawn image. The GPU 19 is adapted to perform the rendering by using the 3D shape data and the texture data specified by the drawing data.

The MDEC 12 is a semiconductor device that operates in parallel with the CPU 10 and has a function of decompressing the data that has been compressed, for example, in MPEG (Moving Picture Experts Group) or JPEG (Joint Photographic Experts Group) format. The DMAC 13 is a semiconductor device that controls DMA transfer to and from each circuit connected to the bus B. The SPU 22 is a semiconductor device that merges the sound data read from the sound memory 23, into an audio output signal.

In this embodiment, the CPU 10, the MDEC 12, DMAC 13, the GPU 19, and the SPU 22 are provided as separate individual hardware components. However, they may be integrated into a single processor with all of such functions. Alternatively, these functions may be achieved by using a multi-core processor.

The input interface 16 receives an input signal from the handling device 161. The handling device 161 has multiple control buttons which enable a user to handle, in various ways, character objects rendered on a display device. The handling device 161 may be, for example, a keyboard, a mouse, or a controller of a video gaming device. The NIC 18 is allowed to receive programs and data from other device (s) via the external network or networks. The programs and data received via the NIC 18 are stored on the storage device 15.

FIG. 2 is a view showing a functional block that is achieved when the computer program according to the present invention is executed by the CPU 10 in the image processor 1. The image processor 1 comprises an input section 30, an object behavior control section 31, an object shape memory section 32, a character location/orientation memory section 33, a character location determination section 34, and a character location/orientation correction section 35. While the image processor 1 requires other functions to provide the geometry processing and the rendering processing, only those necessary for achieving the present invention are described herein and description of the remainders which are similar to those conventionally employed is omitted.

The input section 30 receives the input signal from the handling device 161 via the input interface 16. The handling device 161 is operated by the user. It allows the user to handle the character object(s) or enter various instructions.

The object behavior control section 31 controls behavior such as movement or shaping of all objects including the character objects in the virtual 3D space. For example, the object behavior control section 31 performs physics calculations on all objects including the character objects in the virtual 3D space. The object behavior control section 31 performs physics calculations on the motions of the character objects or other objects, according to the input signal received by the input section 30 to calculate the location and orientation of each character object. The object behavior control section 31 also performs possible physics calculations in the virtual 3D space without any input signals such as those representing the collision between objects. Further, the object behavior control section 31 may control behavior of the objects by using AI (Artificial Intelligence) or animations such as a key frame animation.

The object shape memory section 32 stores properties of the object such as the location and the shape, based on the result of the object behavior control performed by the object behavior control section 31. FIG. 3 shows a specific example of what is stored on the object shape memory section 32. In general, each object is made up of multiple polygons. Thus, the object shape memory section 32 stores parameters such as coordinates of vertices, color(s), and normal vectors of each of the polygons constituting a single object. In the example shown in FIG. 3, parameters such as the coordinates of vertices, the colors, and the normal vectors of the polygons 1 to 3 that constitute the object are stored on the object shape memory section 32. An irregular surface of the object is by a collection of polygons.

When there are two or more objects, parameters such as coordinates of vertices, color(s), and normal vectors of the polygons for each object are stored on the object shape memory section 32. For the object whose shape does not change, the properties such as the location and the shape of the polygons constituting the object that are stored on the object shape memory section 32, do not change as well. For the object whose shape changes, the properties such as the location and the shape of the polygons constituting the object that are stored on the object shape memory section 32, also change as well.

The character location/orientation memory section 33 stores the data for representing a character object, including the location and orientation of the character object, based on the result of the object behavior control performed by the object behavior control section 31. In this embodiment, in order to represent the behavior of the character object, a local coordinate system is used that defines the location and orientation of the character object. The location of the character object is given by the location of the point of origin of the local coordinate system for the character object in the virtual 3D space. The orientation of the character object is given by the direction of the Y-axis of the local coordinate system in the virtual 3D space. The character location/orientation memory section 33 stores the location of the point of origin and the direction of the Y-axis, of the local coordinate system, as the data for representing the location and the orientation of the character object.

FIG. 4 is a view exemplifying such character objects and local coordinate systems. In the example shown in FIG. 4, the point of origin of the local coordinate system is placed at or near the waist of the character object. It may be placed at or near the head or a leg of the character object, if desired. In FIG. 4 (a), the character object is in its upright orientation, so that the Y-axis points vertically upward in the figure. In FIG. 4 (b), the character object is inclined towards right in the figure, so that the Y-axis is inclined towards right.

The character location determination section 34 determines at which location on the object the character object is present, according to the shape of the object stored on the object shape memory section 32, and the location of the character object stored on the character location/orientation memory section 33. The character location determination section 34 has, for example, a convex flag and a concave flag. These flags are used to indicate the place where (i.e., one of a flat portion, a convex portion, a concave portion, and a convex-concave portion of an object 2) the character object 3 is located.

FIG. 5 is a view showing the character object 3 located on the object 2. The object 2 is made up of seven polygons that define the shape of a polyhedral surface. In FIG. 5, the character object 3 is located on the central polygon. The character location determination section 34 determines where (the flat portion, the convex portion, the concave portion, or the convex-concave portion of an object 2) the character object 3 is located, based on the point q on the object 2 that is closest to the point of origin p of the local coordinate system for the character object 3 (hereinafter, referred to as the "nearest point q").

How the location of the character object 3 is determined is described in detail. The character object 3 is located at one of the flat portion, the convex portion, the concave portion, and the convex-concave portion of an object 2. The character location determination section 34 determines where (i.e., one of the flat portion, the convex portion, the concave portion, and the convex-concave portion of an object 2) the character object 3 is located, according to on which polygon of the object 2 it is located.

FIG. 6 is a view illustrating that the character object 3 is located on the flat portion of the object 2. Hereinafter, the character object 3 is represented in the form of a circle.

The fact that it is located on the flat portion can be found by means of determining whether the nearest point q of the character object 3 is located within the flat portion of the polygon. The character location determination section 34 finds that the character object 3 is located on the flat portion of the polygon when an inner product of two vectors is calculated for each side of the polygon and all inner products have a positive value. The two vectors are, in FIG. 6 for example, a vector pointing from the midpoint of one side of the polygon to the point of origin p of the local coordinate system, and a vector pointing from the midpoint of the same side of the polygon to the nearest point q. If it is determined that the character object 3 is located on the flat portion of the polygon, the character location determination section 34 sets both the convex flag and the concave flag to "FALSE".

The character object 3 is located on the flat portion of the polygon when the following three equations are satisfied:

(a vector pointing from the point $m1$ to the point of origin $p$)·(a vector pointing from the point $m1$ to the nearest point $q$)>0, (a vector pointing from the point $m2$ to the point of origin $p$)·(a vector pointing from the point $m2$ to the nearest point $q$)>0, and (a vector pointing from the point $m3$ to the point of origin $p$)·(a vector pointing from the point $m3$ to the nearest point $q$)>0, wherein $m1$, $m2$, and $m3$ represent the midpoints of the sides of the polygon.

Figure 7:
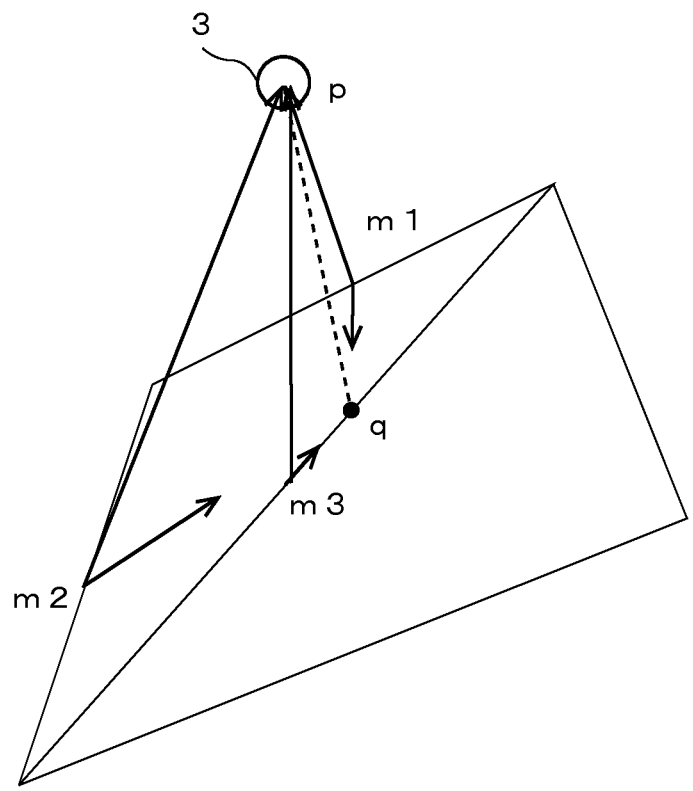
FIG. 7 is a view illustrating that the character object is located on the convex portion of the object.

FIG. 7 is a view illustrating that the character object 3 is located on the convex portion of the object 2.

The fact that it is located on the convex portion can be found by means of determining whether the nearest point q of the character object 3 is located exterior of the side of the polygon. The character location determination section 34 finds that the character object 3 is located on the convex portion of the object 2 exterior of the either side of the polygon when an inner product of two vectors is calculated for each side of the polygon and one or more inner products has/have a value equal to or smaller than "0". The two vectors in this case are, in FIG. 7 for example, a vector pointing from the midpoint of one side of the polygon to the point of origin p of the local coordinate system, and a vector pointing from the midpoint of the same side of the polygon to the nearest point q. If it is determined that the character object 3 is located on the convex portion of the object 2, the character location determination section 34 sets the convex flag to "TRUE".

The character object 3 is located on the convex portion of the object 2 when either one of the following three equations is satisfied:

(a vector pointing from the point $m1$ to the point of origin $p$)·(a vector pointing from the point $m1$ to the nearest point $q$)<=0, (a vector pointing from the point $m2$ to the point of origin $p$)·(a vector pointing from the point $m2$ to the nearest point $q$)<=0, and (a vector pointing from the point $m3$ to the point of origin $p$)·(a vector pointing from the point $m3$ to the nearest point $q$)<=0.

Figure 8:
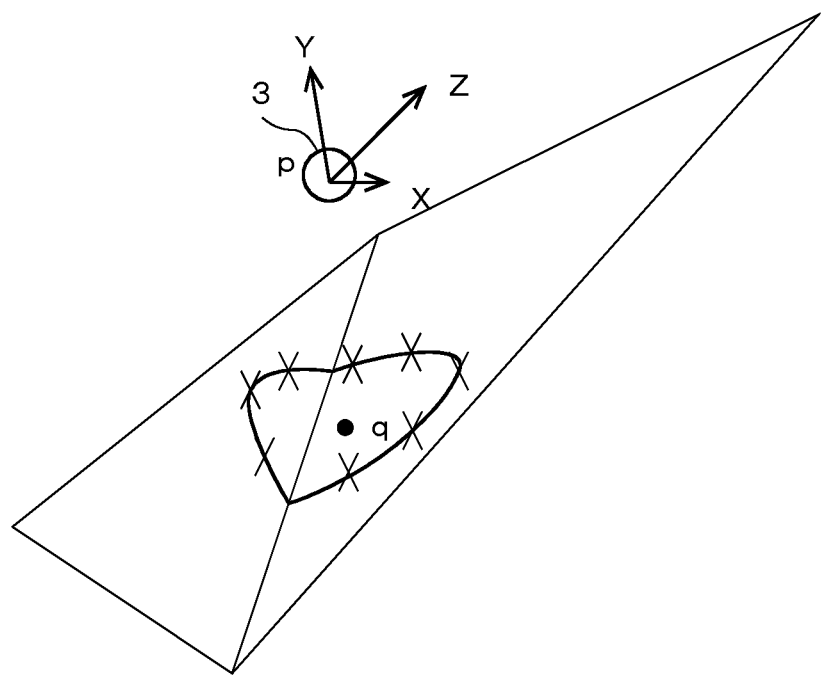
FIG. 8 is a view illustrating that the character object is located in the concave portion of the object.

FIG. 8 is a view illustrating that the character object 3 is located in the concave portion of the object 2. When it is located in the concave portion, the character object 3 should be located within the area of the flat portion of the object 2. Thus, the presence in the area of the flat portion is identified first in the manner described above. When it is located in the area of the flat portion, then the following processing is performed to determine whether it is located in the concave portion or not.

The presence in the concave portion can be identified by means of assuming a sphere having a size corresponding to the size of the character object 3 and determining whether the sphere contacts with the object 2 at points on two or more polygons. The character location determination section 34 determines that the character object 3 is located in the concave portion of the object 2 when there are contact points on two or more polygons, and sets the concave flag to "TRUE".

Figure 9:
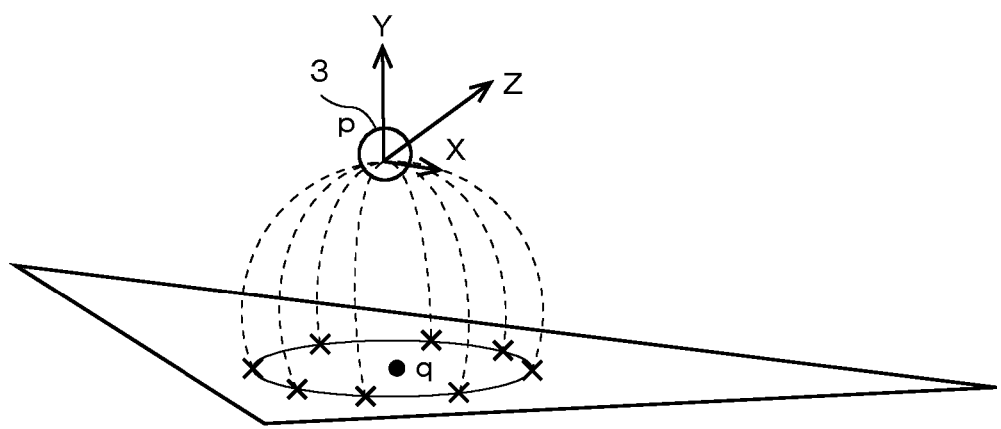
FIG. 9 is a view illustrating contact points between the sphere and the object.

FIG. 9 is a view illustrating contact points between the sphere and the object 2. In FIG. 9, the contact points between the sphere and the object 2 are calculated by using a so-called ray casting technique. With the ray casting technique, ray is traced spherically from the point p. It is determined whether each intersection (point represented by "X" in FIG. 9) between the polygon and the ray is placed in the same plane as the nearest point q. Whether they are on the same plane can be determined by using an inner product of a normal vector to the polygon having the intersection and a vector pointing from the intersection to the nearest point q.

When the inner product has a positive value, the polygon having that intersection and the polygon having the nearest point q are in the concave relationship. When the inner product is equal to "0", the polygon having that intersection and the polygon having the nearest point q are on the same plane. When the inner product has a negative value, the polygon having that intersection and the polygon having the nearest point q are in the convex relationship. The character location determination section 34 considers that the character object 3 is in the concave portion of the object 2 when at least one of the intersections is in the concave relationship. In addition, without using the procedure described in conjunction with FIG. 7, when the inner product has a negative value, then it can be considered that the character object is located on the convex portion.

If some inner products have a positive value and others have a negative one for different intersections obtained by using, for example, the ray casting, it can be identified that the character object 3 is located in the convex-concave portion. The character location determination section 34 sets the convex flag to "TRUE" when the character object 3 is determined to be located within the convex-concave portion of the object 2.

As described above, according to the status of the convex flag and the concave flag in the character location determination section 34, the location of the character object 3 (one of the flat portion, the convex portion, the concave portion, and the convex-concave portion of the object 2) is identified as follows.

| Convex flag | Concave flag | location relationship between the character object 3 and the object 2 |
|---|---|---|
| FALSE | FALSE | the character object 3 is located on the flat portion of the object 2 |
| TRUE | FALSE | the character object 3 is located on the convex portion of the object 2 |

-continued

| Convex flag | Concave flag | location relationship between the character object 3 and the object 2 |
|---|---|---|
| FALSE | TRUE | the character object 3 is located in the concave portion of the object 2 |
| TRUE | TRUE | the character object 3 is located on the convex-concave portion of the object 2 |

The character location/orientation correction section 35 corrects the location and orientation of the character object 3 by using the location relationship between the character object 3 and the object 2, which is determined by the character location determination section 34. The corrected location and orientation of the character object 3 are stored on the character location/orientation memory section 33.

When the character object 3 is located on the flat portion of the object 2, the character location/orientation correction section 35 corrects the location and orientation of the character object 3 as shown in FIGS. 10(*a*) to (*c*).

As a result of the behavior control for the character object and the object by means of the object behavior control section 31, when the character object 3 is located on the flat surface of the object as shown in FIG. 10(*a*) and when the point of origin p of the local coordinate system is located on the flat surface of the polygon, then the character location/orientation correction section 35 rotates the local coordinate system in such a manner that the Y-axis points the direction of the normal vector n of the flat surface in question, as shown in FIG. 10(*b*). However, the angle which rotates the local coordinate system is limited to prevent any significant change in orientation of the character object 3 which otherwise may occur as a result of the rotation of the local coordinate system. Then, the character location/orientation correction section 35 shifts the point of origin p along the Y-axis to the point away from the nearest point q by a distance h, according to the size of the character object 3, as shown in FIG. 10(*c*). In this way, the location of the character object 3 is corrected to provide a new point of origin p' of the local coordinate system.

The distance h is a value that depends on factors such as on which part of the character object 3 the point of origin p of the local coordinate system is placed, or whether the character object 3 is upstanding or lying. The distance h is determined at the time of the modeling of the character object 3 or after the behavior control by the object behavior control section 31 according to the orientation of the character object 3 during the operation.

When the character object 3 is located on the convex portion of the object 2, the character location/orientation correction section 35 corrects the location and orientation of the character object 3 in the manner as shown in FIGS. 11(*a*) to (*c*).

As a result of the behavior control by means of the object behavior control section 31, when the point of origin p of the local coordinate system of the character object 3 is located on the convex portion of the object 2 of the polygon, as shown in FIG. 11(*a*), then the character location/orientation correction section 35 rotates the local coordinate system in such a manner that the Y-axis points the direction connecting between the nearest point q and the point of origin p of the local coordinate system, as shown in FIG. 11(*b*). However, the angle which rotates the local coordinate system is limited to prevent any significant change in orientation of the character object 3 which otherwise may occur as a result of the rotation of the local coordinate system. Then, the character location/orientation correction section 35 shifts the point of origin p along the Y-axis to the point away from the nearest point q by a distance h, according to the size of the character object 3, as shown in FIG. 11(c). In this way, the location of the character object 3 is corrected to provide a new point of origin p' of the local coordinate system.

When the character object 3 is located on the convex portion of the object 2, the character object 3 may move in a sliding manner although there is no input signal received from the outside, after the operations shown in FIGS. 11(a) to (c). For example, the direction of the Y-axis of the local coordinate system does not necessarily coincide with the direction connecting the point of origin p and the nearest point q because the angle which rotates the local coordinate system is limited. Thus, the shift in position of the character object 3 in the direction of the Y-axis in FIG. 11(c) causes the shift in position of the nearest point q. This movement of the character object 3 in the sliding manner is described with reference to FIG. 12.

Figure 12:
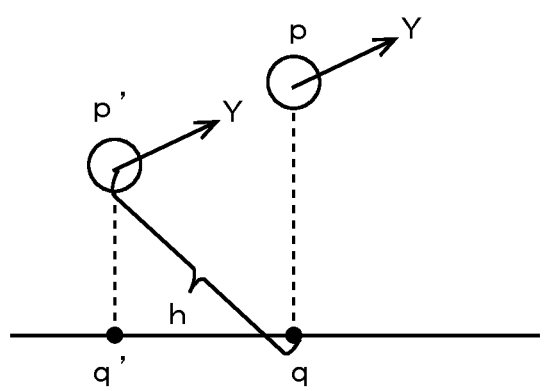
FIG. 12 is a view illustrating the movement of the character object in the sliding manner.

In FIG. 12, the point of origin p of the local coordinate system of which Y-axis has been rotated by the character location/orientation correction section 35 then moves along the Y-axis to the position of the point of origin p'. The point of origin p' is away from the nearest point q by the distance h. The nearest point q' of the character object 3 is thus co-located with the point of origin p' as a result of the correction by the character location/orientation correction section 35, and is located at different position from the nearest point q. This is why the character object 3 moves without any input from the outside in the immediately subsequent correction made by the character location/orientation correction section 35. A successive sequence of this causes the sliding movement of the character object 3 which seemingly occurs independent of any operation.

Taking this into consideration, it is necessary to take measures to prevent the character object 3 from sliding on the convex portion. FIG. 13 is a view illustrating how to prevent the sliding. The Y-axis of the local coordinate system of the character object 3 rotates from Y_0 to Y_1 as a result of correcting the orientation of the character object 3 by the character location/orientation correction section 35. The nearest point q_1 represents the nearest point at this time. The nearest point q_1 is shifted to the contact point q_2 between the Y-axis Y_1 and the polygon. Then, the contact point q_2 is used as the nearest point to correct the location, thereby preventing the character object 3 from being moved regardless of the instructions.

Figure 14:
FIG. 14 is a view illustrating a status where the character object is located at the edges of two or more polygons.

It should be noted that, when the character object 3 is located at the edges of two or more polygons as shown in FIG. 14, it may be better not to take such measures. One reason is that the character object 3 may be placed over an edge of another polygon at or near the position where edges of the polygons are concentrated.

Whether the measures should be taken or not can be determined by the character location/orientation correction section 34 every time when the correction is made, depending on the exact location of the character object 3 on/in the object 2 as well as on the behavior of the character object 3 is controlled by the object behavior control section 31.

When the character object 3 is located in the concave portion of the object 2, the character location/orientation correction section 35 corrects the location and orientation of the character object 3 as shown in FIGS. 15 to 18. In this event, one of different procedures is employed to correct the location and orientation of the character object 3 in the concave portion depending on the following two factors. One factor is whether there is an input signal from the handling device 161 to move the character object 3. The other is the amount of movement of the nearest point q. Thus, the character location/orientation correction section 35 first determines whether there is an instruction to move the character object 3, and determines the amount of movement of the nearest point q.

The presence of the movement instruction can be determined according to whether the input section 30 has received from the handling device 161 an input signal indicating that the character object 3 should be moved. The amount of movement of the nearest point q can be calculated as a distance L from the immediately previous nearest point q_0 and the current nearest point q_1. Comparison between the distance L and a predetermined amount L_0 makes it possible to determine whether the amount of movement is smaller than, equal to, or larger than the predetermined amount.

When the character object 3 is instructed to move and the amount of movement of the nearest point exceeds the predetermined amount, the following operations are performed.

Movement of the nearest point across the polygon as shown in FIG. 15 may cause discontinuity of the location and orientation of the character object 3. This is because the location and orientation of the character object 3 is corrected based on the nearest point. In order to solve this problem, an interpolation point is provided on the object 2 to interpolate the locations of the nearest points q_0 and q_1.

Referring to FIGS. 16 to 18, how the interpolation point is obtained is described.

As shown in FIG. 16, a division point r is obtained that divides the segment between the nearest point q_0 and the nearest point q_1 into a:b. The location of the division point r depends on the amount that the character object 3 is moved in response to an external input. A contact point q_d is defined at the point where the polygon contacts with the segment between the division point r and the point of origin p_1 of the local coordinate system of the character object 3.

The local coordinate system representing the orientation of the character object 3 is rotated in such a manner that the Y-axis thereof coincides with the direction perpendicular to the segment connecting between the nearest point q_0 and the nearest point q_1.

The character object 3 is moved from the polygon including the nearest point q_1 by the distance h on the line connecting the contact point q_d and the point of origin p_1 of the local coordinate system, as shown in FIG. 17.

As apparent from the above, the character location/orientation correction section 35 corrects the location and orientation of the character object 3.

When the character object 3 is instructed to move, the amount of movement of the nearest point is smaller than the predetermined amount, and the nearest point is not shifted across any polygon, the character object 3 is corrected in location and orientation by using operations similar to those taken when the character object 3 is located on the flat portion of the object 2.

When the character object 3 is not instructed to move, the amount of movement of the nearest point exceeds the predetermined amount, and the nearest point is shifted across two or more polygons, the following operations are performed.

The character object 3 is supposed not to move because there is no input from the outside. However, the processing as described in conjunction with FIGS. 16 and 17 may cause movement of the character object 3 during the subsequent operation. This is because the nearest point q_1 is not actually closest to the polygon (i.e., the nearest point is shifted). The point q_n in FIG. 18 is actually closest to the polygon.

Accordingly, an operation is made to consider the point q_d in FIG. 17 as the nearest point, before correcting the location and orientation of the character object 3. This prevents the character object 3 from being moved without any input from the outside. Further, when the point of origin p_1 of the local coordinate system of the character object 3 in FIG. 15 is away from two polygons by approximately the same distance, the character object 3 may move discontinuously and skip a space between these two polygons. By defining the nearest point at the point q_d as described above can also prevent this discontinuity problem.

When the character object 3 is not instructed to move and the amount of movement of the nearest point is smaller than the predetermined amount, the nearest point, the location and the orientation of the character object 3 are kept without any modification.

Now, FIG. 19 is used to describe how to correct the location and orientation of the character object 3 when it is located on the object 2 having both convex and concave portions. In this event, one of different procedures is employed depending on whether there is an input from the outside and on the amount of movement of the nearest point.

Even when the point of origin p of the local coordinate system of the character object 3 is changed, the character object 3 stays on the edge contour line of the same convex portion as long as the nearest point to the object 2 is kept constant. The character object 3 is thus kept at the same location in the same orientation. On the other hand, when the point of origin p is moved and the nearest point is also moved, the operation taken is identical to the one described in conjunction with the correction of the location and orientation for the concave portion.

Figure 20:
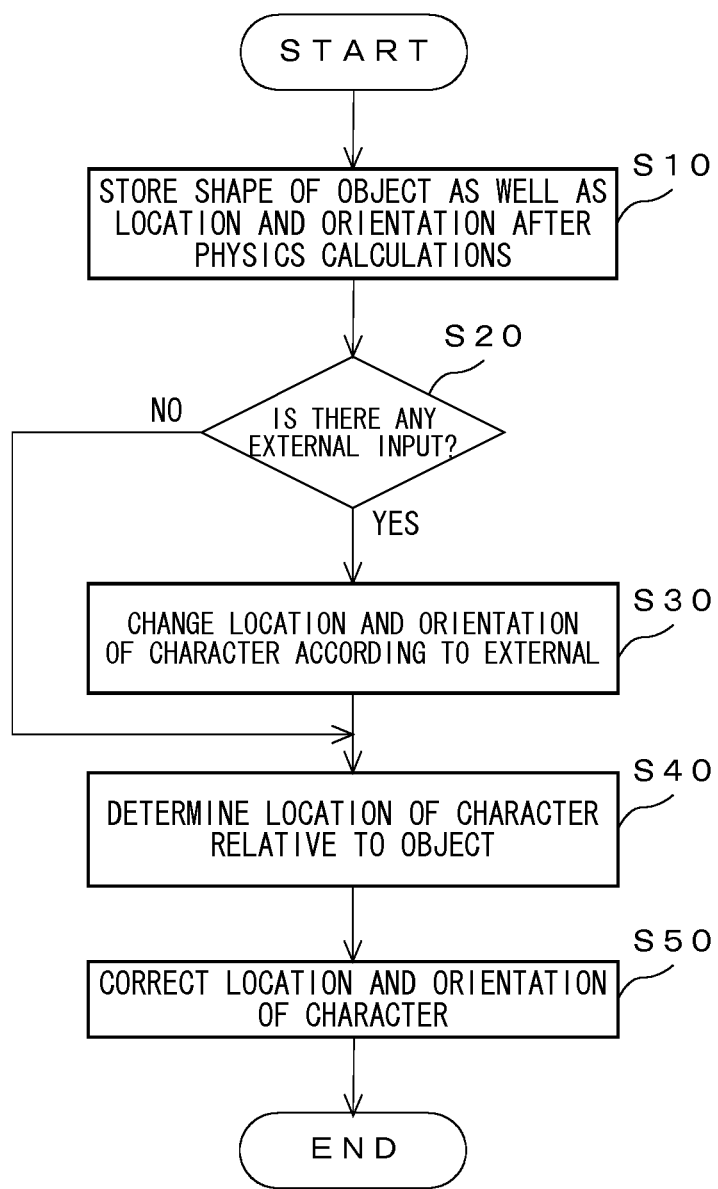
FIG. 20 is a flow chart illustrating a process flow for processing images by means of correcting location and orientation of the character object using the image processor.

FIG. 20 is a flow chart illustrating a process flow for processing images by means of correcting location and orientation of the character object using the image processor 1. Only such a part of the process flow of the image processing that relates to the present invention is described in FIG. 20, and conventional image processing such as rendering is not described here. This image processing is for processing animations and is performed sequentially by 1 frame at a time until all animations are processed. For example, when the animations are for action adventure games, the image processing is performed sequentially until the game is over.

The image processor 1 stores the shape of the object in the immediately previous frame on the object shape memory section 32 and the location and orientation of the character object are stored on the character location/orientation memory section 33 in order to generate an image of that object in the current frame (step S10).

Next, if there is any external input from the handling device 161 (step S20: YES), the object behavior control section 31 controls, for example, the location and orientation of the character object according to the external input. As a result of this control, the location and orientation of the character object stored on the character location/orientation memory section 33 are updated. If properties such as the location and shape of the object are changed in response to the change in location and orientation of the character object, the properties such as the shape and location stored on the object shape memory section 32 are also updated (step S30).

After the change in location and orientation of the character object according to the external input, or when there is no external input (step S20: NO), the image processor 1 determines the location of the character object relative to the object by using the character location determination section 34 (step S40). This operation identifies where (i.e., one of a flat portion, a convex portion, a concave portion, and a convex-concave portion of the object) the character object is located.

Next, the image processor 1 corrects the location and orientation of the character object as described above, according to the location of the character object relative to the object, by using the character location/orientation correction section 35 (step S50). The result of this correction is reflected to what is stored on the character location/orientation memory section 33.

As apparent above, correction of the location and orientation of the character object after controlling the movement makes it possible to provide representation of more natural and smoother movement of the character object that contacts the object.

What is claimed is:

1. An image processor comprising:
    object movement control means for controlling an object and movement of a character object in a virtual 3D space, the character object being capable of being moved in the virtual 3D space according to an operation by a user, the object being made up of one or more polygons in the virtual 3D space;
    character location determination means for identifying the shape of a part of said object that is closest to said character object, according to the one or more polygons of said object and the location of said character object obtained as a result of movement control, wherein the shape of said part of said object is identified as any of flat, convex, concave, and convex-concave; and
    character location/orientation correction means for correcting the location and orientation of said character object relative to said object by shifting or rotating said character object's coordinate system, according to the result of the shape identification by said character location determination means.

2. The image processor as claimed in claim 1, wherein:
    said object has a surface made up of polygons having either one of flat, convex, concave, and convex-concave shapes;
    said character location determination means being adapted to determine to which one of the flat, convex, concave, and convex-concave shapes of said object said character object is closest to;
    said character location/orientation correction means being adapted to correct the location and orientation of said character object according to the shape of said part of said object that is located closest to said character object.

3. The image processor as claimed in claim 1,
    wherein: the location and orientation of said character object is defined in a local coordinate system of said character object to represent the movement of said character object,
    said character location determination means being adapted to identify the shape of said part of said object that is closest to said character object, according to the positional relationship between the point of origin of said local coordinate system and the polygon that is closest to that point of origin.

4. The image processor as claimed in claim 1, wherein: said character location determination means identifies the shape of said part of said object that is closest to said character object by using a contact point between one or more polygons that constitute said object and a virtual sphere having a size corresponding to said character object in said virtual 3D space.

5. The image processor as claimed in claim 3, wherein:
    said character location/orientation correction means is adapted to correct the orientation of said character object by means of rotating said local coordinate system, and correct the location of said character object by means of shifting the point of origin of said local coordinate system.

6. The image processor as claimed in claim 5, wherein: said character location/orientation correction means has a limitation in angle which rotates said local coordinate system.

7. The image processor as claimed in claim 5, wherein said character location/orientation correction means is adapted to correct the location of said character object by means of shifting said point of origin in the direction of the Y-axis after correction of said local coordinate system.

8. The image processor as claimed in claim 7, wherein: said character location/orientation correction means is adapted to correct the location of said character object by means of shifting said character object in either one of two procedures when said part of said character object that is closest to said object is shifted as a result of the movement of said character object, the two procedures being (1) to move said character object by an amount identical to the amount of movement of a point that is closest to said character object before being shifted, and (2) to move a point that is closest to said character object after being shifted back to the location where it was before being shifted.

9. A method of processing images that is carried out by an image processor comprising object movement control means for controlling an object and movement of a character object in a virtual 3D space, the character object being capable of being moved in the virtual 3D space according to an operation by a user, the object being made up of one or more polygons in the virtual 3D space, said method comprising:
identifying with a processor the shape of a part of said object that is closest to said character object, according to the one or more polygons of said object and the location of said character object obtained as a result of movement control, wherein the shape of said part of said object is identified as any of flat, convex, concave, and convex-concave shapes; and
correcting with a processor the location and orientation of said character object relative to said object by shifting or rotating said character object's coordinate system, according to the result of the shape identification.

10. A program product stored on a non-transitory computer readable recording medium comprising instructions to implement the method according to claim 9.

11. A non-transitory computer readable recording medium storing a computer program to implement the method according to claim 9.

12. A semiconductor device for use in establishing, in an image processor comprising
object movement control means for controlling an object and movement of a character object in a virtual 3D space, the character object being capable of being moved in the virtual 3D space according to an operation by a user, the object being made up of one or more polygons in the virtual 3D space;
character location determination means for identifying the shape of a part of said object that is closest to said character object, according to the one or more polygons of said object and the location of said character object obtained as a result of movement control, wherein the shape of said part of said object is identified as any of flat, convex, concave, and convex-concave shapes; and
character location/orientation correction means for correcting the location and orientation of said character object relative to said object by shifting or rotating said character object's coordinate system, according to the result of the shape identification by said character location determination means.

* * * * *